United States Patent

Shelby et al.

[11] Patent Number: 6,059,614
[45] Date of Patent: *May 9, 2000

[54] MODULAR INFORMATION AND PROCESSING CENTER

[75] Inventors: Kevin A. Shelby, Scotch Plains, N.J.; Matthew S. Whalen, Laguna Niguel, Calif.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/752,913

[22] Filed: Nov. 20, 1996

[51] Int. Cl.⁷ ....................................... H01R 9/22

[52] U.S. Cl. .................... 439/717; 439/928; 361/735; 361/744

[58] Field of Search .................... 439/717, 928; 361/735, 729–733, 744

[56] References Cited

U.S. PATENT DOCUMENTS

| | | | |
|---|---|---|---|
| 5,227,957 | 7/1993 | Deters | 439/928 |
| 5,472,347 | 12/1995 | Nordenstrom et al. | 439/928 |
| 5,493,194 | 2/1996 | Damiano et al. | 439/928 |
| 5,508,886 | 4/1996 | Bernecker et al. | 439/928 |
| 5,645,434 | 7/1997 | Leung | 439/928 |
| 5,667,399 | 9/1997 | Jackson et al. | 439/928 |
| 5,676,553 | 10/1997 | Leung | 439/928 |

*Primary Examiner*—Gary F. Paumen

[57] ABSTRACT

A modular home information center includes a number of processing modules having substantially identical housings with each of the modules having an operating structure and a multi-bus connector within the housing of the module. Each multi-bus connector is connected to the operating structure within the housing and is engagable and disengageable to form a multi-bus network interface when engaged. The housings and the connectors are interchangeable relative to other housings and connectors, and the connectors when engaged constrain the housings to maintain a uniform parallel relation with each other.

17 Claims, 5 Drawing Sheets

MODULAR INFORMATION AND PROCESSING CENTER

FIELD OF THE INVENTION

This invention relates to modular information and processing centers, and particularly a modular home information center.

BACKGROUND OF THE INVENTION

Various devices are used to provide information and entertainment in the home. These devices, such as television sets, video cassette recorders, telephones, etc., normally stand independently of each other and require special interconnection.

SUMMARY OF THE INVENTION

According to an embodiment of the invention an information and processing center includes a plurality of processing modules each having substantially identical housings, each of the modules having an operating structure and a multi-bus connector within the housing, the multi-bus connectors being connected to the operating structure within the housing. A network connector and the multi-bus connectors are engageable and disengagable and form a multi-bus network interface when engaged. The housings and the connectors are interchangeable relative to other housings and the connectors when engaged constrain the housings to maintain a uniform parallel relation with each other.

DETAILED DESCRIPTION OF PREFERRED EMBODIMENTS

Figure 1:
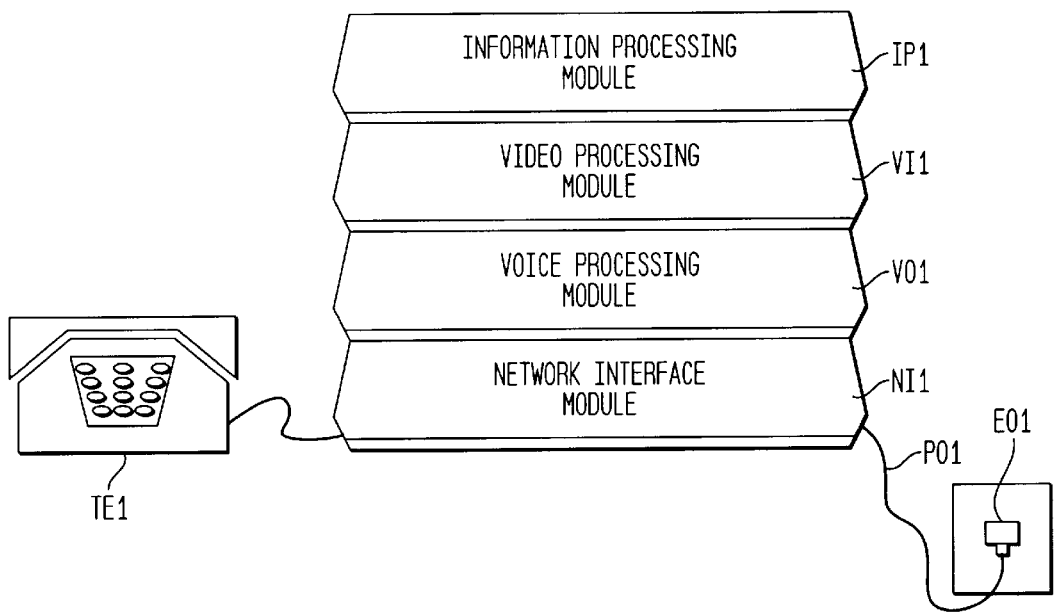
FIG. 1 is a schematic illustration of a modular home information center embodying the invention.

FIG. 1 is an elevation of a home information center embodying the invention. Here, a telephone set TE1 connects to a network interface module NI1 which is powered by a power cord PO1 connected to an electrical outlet EO1. Network interface module NI1 is one of 4 modules stacked on top of each other. A voice processing model VP1 sits on the network interface module NI1 and holds a video processing module VI1 which in turn supports an information processing module IP1 that sits on the video processing module VI1. Each of the modules NI1, VO1, VI1 and IP1 includes an identical housing containing connections to form a multi-bus structure. Its architecture reduces the cost of introducing features and services by sharing resources across modules. The arrangement relaxes structural constraints and reduces the incremental costs of access to new service capabilities. The modules of NI1, VO1, VI1 and IP1 stack one on top of the other.

Figure 2:
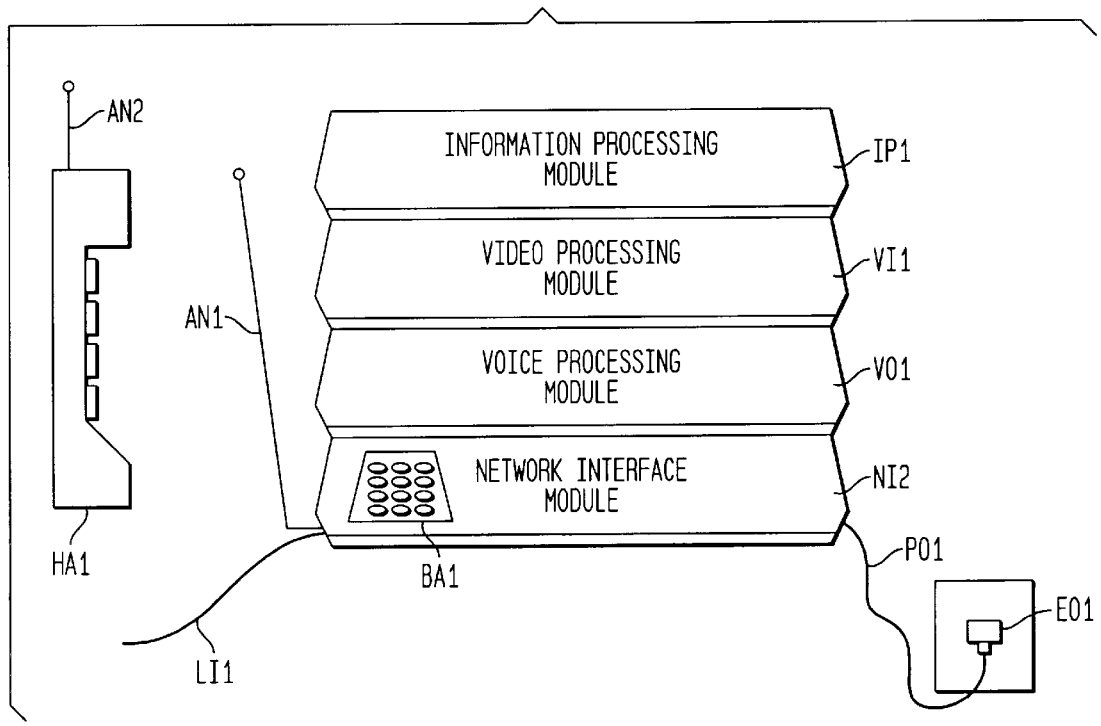
FIG. 2 is another embodiment of a home information center.

The arrangement in FIG. 2 utilizes structures corresponding to those of FIG. 1 and where those structures are the same they are identified by the same reference characters. In FIG. 2 a network interface module NI2 includes a base BA1 connected to a telephone network via a line LI1 for a cordless handset HA1, an antenna AN1 from the network interface module NI2 and the base BA1 communicates with an antenna AN2 on the handset HI1.

As in FIG. 1, the network interface module NI2 supports a voice processing module NI1, a video processing module VI1, and an information processing module IP1 corresponding to the modules of FIG. 1. The housings of the modules are stacked one on the other.

Figure 3:
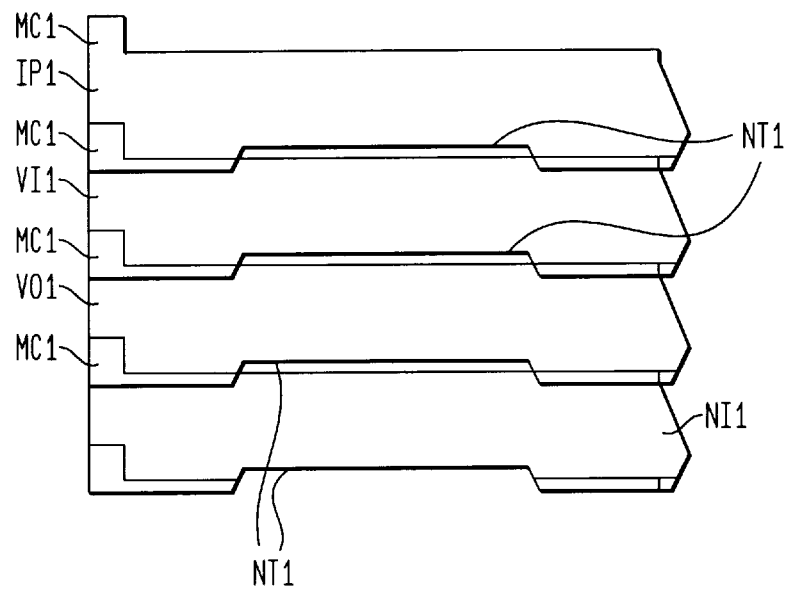
FIG. 3 is a side view of another modular home information center embodying the invention.

FIG. 3 illustrates the housings of the modules of FIG. 1, although they also may represent the housings of FIG. 2 stacked on one another in a side view. Each of the modules includes a housing which is notched at the bottom with notches NT1 to provide air flow and to maintain a secure fit.

A multi-bus connector MC1 in each of the modules projecting from the tops of each of the housings of the modules connects to a receptacle the housing above provide connection to the next module.

Figure 4:
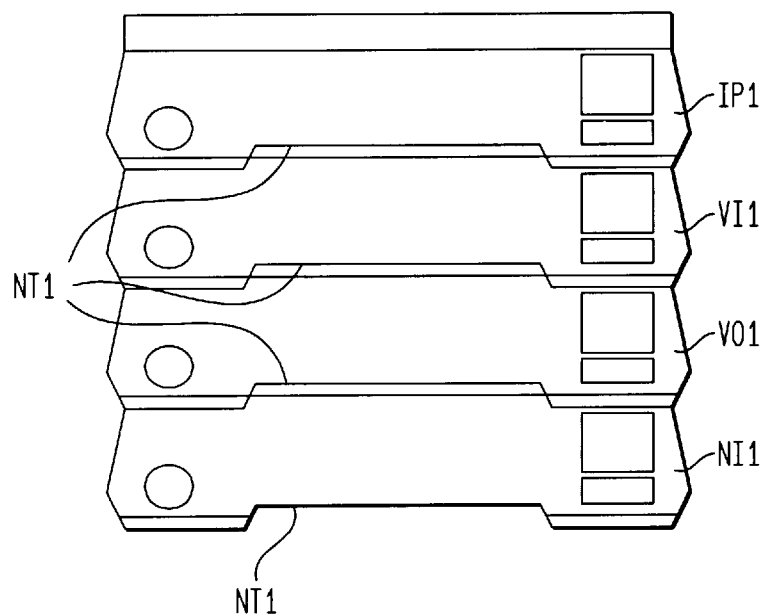
FIG. 4 is a front view of the center in FIG. 3.

FIG. 4 illustrates a front view of the modules in FIG. 3.

Figure 5:
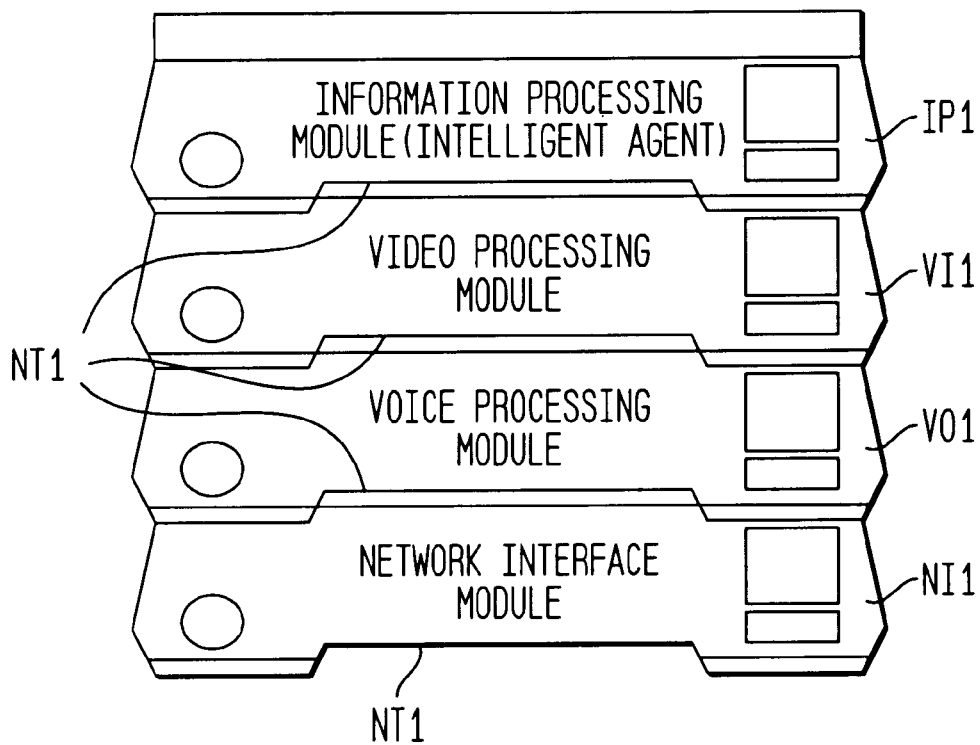
FIG. 5 is an elevation of another modular home information center embodying the invention.

FIG. 5. also illustrates the front view of the modules in FIG. 3 wherein the module IP1 performs information processing and contains a CPU, memory, and an extended keyboard interface.

The module VI1 includes a video encoder and decoder, input output, digital signal processors (DPSs), and program memory.

The voice processing module VO1 includes a digital to analog—analog to digital (D/A-A/D) converter, input output buffers, DSPs, and program memory. The network interface module NI1 as well as the network interface module NI2 includes a line interface, a modem, and a communication processor having input output buffers, CPU, and memory.

An application can be defined across functional modules as follows to facilitate ease of use. Each module is assigned a primary signal processing task. Any module, however, may be evoked by another to perform a task related to its primary function. For example, the video processing module would initiate a video phone call in response to the user pressing the video button associated with that module. It would in turn, evoke the network interface module and audio processing module for channel coding (i.e., modem) and speech coding respectively. Likewise, the network interface module may provide a listing of repertory numbers for display on an external monitor through the video module VI1.

Figure 6:
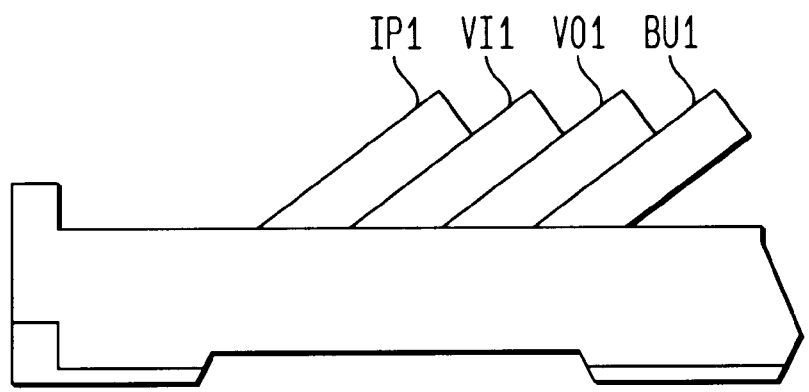
FIG. 6 is an elevation of still another home information center embodying features of the invention.

FIG. 6 illustrates another embodiment of the invention. This represents an alternate configuration for the modular structure. Here, a base unit BU1 performs the function of the network interface module NI1 or network interface module NI2 and accepts multiple modules such as IP1, VI1, VO1, etc. Each module IP1, VI1, VO1, etc. adds the signal processing and memory capabilities required by a given application. Resource sharing between modules is maintained and the user interface follows the pattern described with respect to the stackable arrangement of FIGS. 1 to 5.

Figure 7:
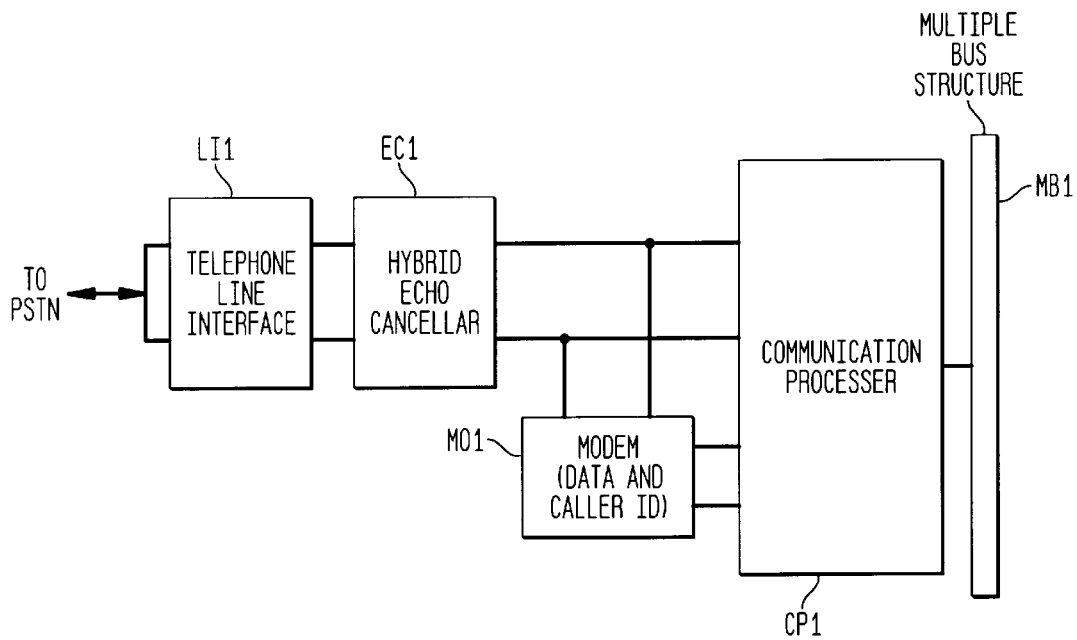
FIG. 7 is a block diagram of network interfaces in FIGS. 1, 2, 3, 4, 5, and 6.

FIG. 7 illustrates details of the network interface modules NI1 and NI2 in FIGS. 1 to 5 as well as the network interface module forming part of the base unit BU1 in FIG. 6. The network interface modules NI1 and NI2 as well as that in base unit BU1 contain a communication processor CP1 which places data on a multiple bus structure MB1 and accepts the data from the structure MB1. The multiple bus structure MB1 passes through the multi-bus connectors MC1 shown in FIG. 3 to each of the modules. The communication processor implements a protocol enabling the network interface modules NI1, NI2 and that in base unit BU1 to share data with the other modules IP1, VI1 and VO1. Each of the modules contains a communication processor which serves the purpose of implementing a protocol enabling the modules to share data with other modules. The protocols vary with the functions of the modules.

In FIG. 7, a telephone line interface LI1 furnishes access to a public switched telephone network (PSTN). The latter provides the line interface LI1 with a variety of telephone functions. A hybrid echo canceler EC1 connects to the telephone line interface for providing known echo cancellation and passes its signals to a communication processor CP1. The latter implements a protocol enabling the network interface module to share PCM (pulse code modulation) speech with other modules through the multi-bus structure MB1 for passing the signals from the canceler EC1. The multiple bus structure MB1 passes through the multi-bus connectors MC1 shown in FIG. 3 to each of the modules. The communication processor CP1 also passes signals between a modem MO1 with data and caller ID and the multiple bus structure. The communication processor CP1 implements a protocol enabling the network interface module to share data with other modules through the multiple bus structure MB1. The modem MO1 passes signals between the hybrid echo canceler EC1 and the communication processor CP1. The multiple bus structure MB1 is common to each of the modules IP1, VI1, VO1, NI1, in any one of the embodiments of FIGS. 1 to 6.

Figure 8:
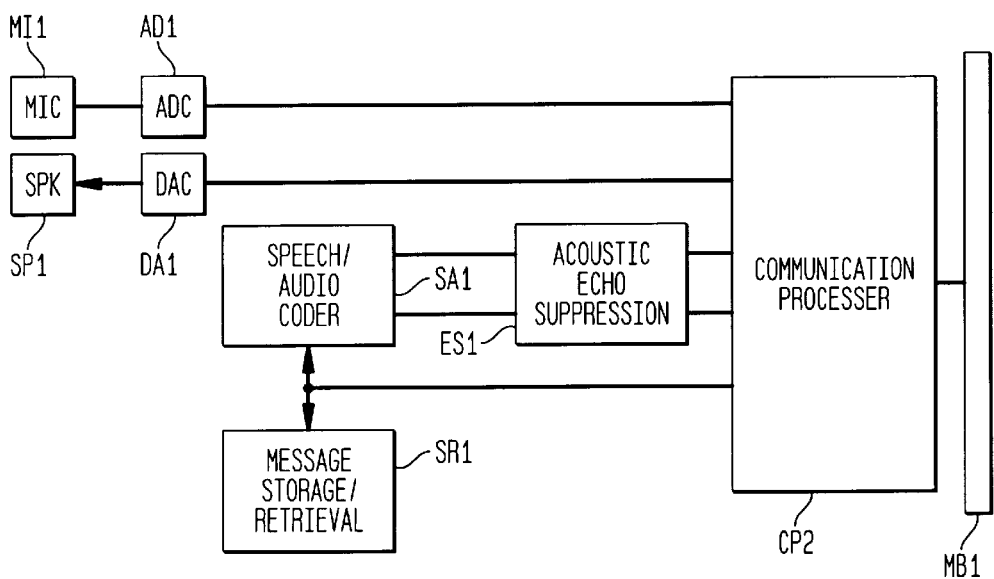
FIG. 8 is a block diagram of the audio processing systems in FIGS. 1 to 6.

FIG. 8 is a block diagram of the audio processing module in each of the systems of FIGS. 1 to 6. This module provides speech and audio coding facilities for voice messaging, digital audio, or low bitrate speech communication. It also furnishes acoustic echo suppression and line in/out facilities for enhanced speakerphone functionality. The speech coding facilities can also be accessed by other modules to decode and play back audio files.

In FIG. 8, an analog to digital converter AD1, processes input from an external or internal microphone MI1 and connects to communication processor CP2 which corresponds to the communication processor CP1. In FIG. 8, the communication processor CP2 implements a protocol enabling data to pass to and from the multiple bus structure MB1 and to share the data with other modules through the communication processor. The communication processor CP2 implements a protocol which applies data to a digital to analog (D/A) converter DA1 which in turn connects to an external or internal speaker SP1.

The communication processor CP2 also implements a protocol allowing PCM speech to be placed on the bus structure MB1 and to receive PCM speech from the bus structure thereby enabling the module to share the speech with other modules. The communication processor passes signals between the multiple bus structure MB1 and an acoustic echo suppression circuit ES1. The latter passes signals between itself and a speech audio coder SA1. A message storage and retrieval arrangement SR1 exchanges data with the speech audio coder SA1 and also with the communication processor CP2. The latter implements a protocol that addresses the multiple bus structure MB1 to pass signals from the message storage and retrieval arrangement SR1 and the speech audio coder SA1 to the multiple bus structure MB1.

Figure 9:
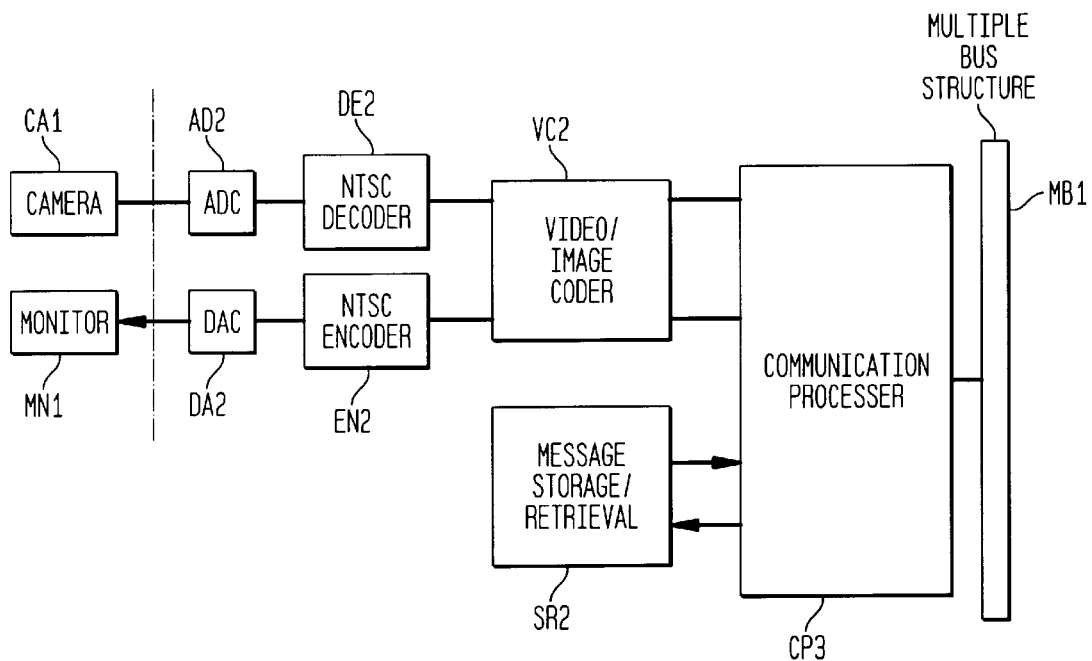
FIG. 9 is a block diagram of the video processing module in FIGS. 1 to 6.

FIG. 9 illustrates the video processing module VI1 of FIGS. 1 to 6. Here an external camera CA1 passes analog signals to an analog to digital converter AD2 that converts the signals into digital form. An NTSC (National Television System Committee) decoder DE2 decodes the digital signals. An external monitor MN1 receives analog video data through a digital to analog converter DA2 from an NTSC encoder EN2 that produces digital signals. A video image coder VC2 provides incoming image signals to the NTSC encoder EN2 and receives decoded data from the decoder DE2. A communication processor CP3 implements a protocol to address the monitor bus and to pass signals between the video image coder VC2 and the multiple bus structure MB1 so as to share the signals from and to the video image coder and from and to a message storage and retrieval arrangement with other modules.

The video processing module provides video and image coding facilities for digital video storage and visual communications. It provides standard video in/out facilities which can be accessed by other modules in manipulating visual information.

Figure 10:
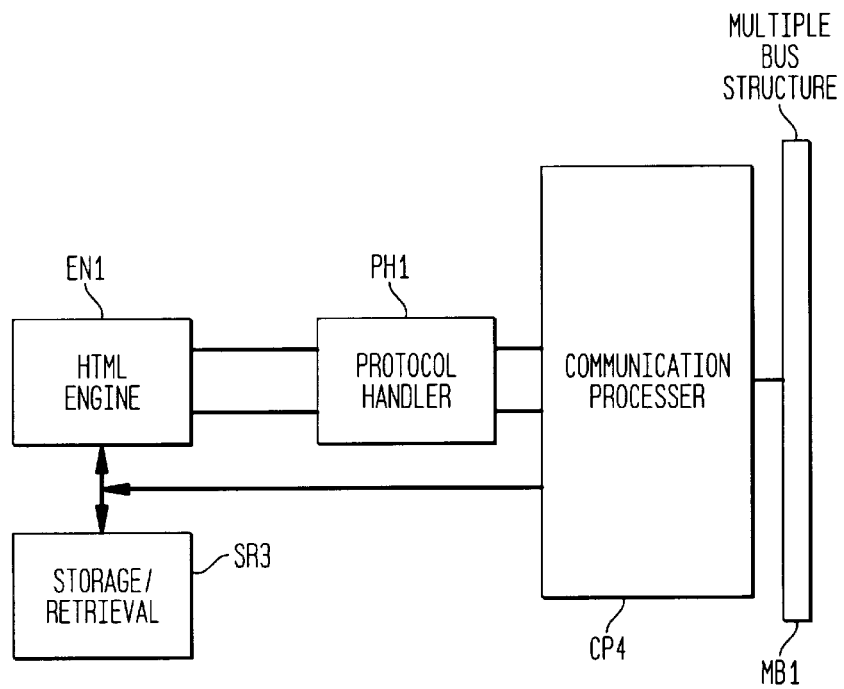
FIG. 10 is a block diagram of the information processing modules in FIGS. 1 to 6.

FIG. 10 illustrates the information processing module IP1 in FIGS. 1 to 6. Here, a communication processor CP4 places data on the multiple bus structure MB1 and receives data therefrom by virtue of the processor implementing a protocol to enable the modules to share the data. A protocol handler PH1 passes data between the communication processor and HTML (Hypertext Markup Language) engine EN1. A storage and retrieval arrangement SR3 stores data from, and provides data to, both the HTML engine and the communication processor CP4.

The information processing module provides the interface and the transfer protocols necessary for processing hypertext/multimedia, e.g. tcp/ip, http. This module relies on the other modules for accessing the public switched telephone network (PSTN) and in processing media files received in an information transaction.

Each of the modules includes a connector in a back plane, the connector of one of the modules connects to the back plane of another of the modules to form a bus.

The disclosed system is not limited to the types of modules specifically illustrated. Other types of modules may be added or substituted. For example, according to an embodiment, a module that processes a musical keyboard is added or substituted. Also, the elements of the modules need not be those shown. Each communication processor implements a protocol suitable for the particular functions being performed by the module so that it transfers data to and from the other modules.

While embodiments of the invention have been described in detail, it will be evident to those skilled in the art that the invention may be embodied otherwise.

What is claimed is:

1. An arrangement, comprising:

a plurality of processing modules;

each of said modules having substantially identical housings;

each of said modules having an operating structure and a multi-bus connector within said housing of said module;

said multi-bus connectors being connected to said operating structure within said housing;

said multi-bus connectors being engagable and disengageable and forming a multi-bus network interface when engaged with each other and connecting to each other when engaged;

said housings and said connectors being interchangeable relative to other housings and connectors; and said connectors when engaged constraining said housings to maintain a uniform parallel relation with each other;

the operating structure of each of said modules being different from the operation structure of each of the others of said modules, whereby different and distinct functions can be performed by each of said operating structures;

each of said structures containing communication processors and being removable, and when removed, removing the distinct function performed by said structure;

one of said modules being a voice processing module, one of said modules being a video module, and one of said modules being an information processing module, said modules forming a home information center.

2. An arrangement as in claim 1, wherein said housings each have recesses and protrusions, said protrusion of one of said housings fitting into the recess of another said housings when said connectors are engaged.

3. An arrangement as in claim 1, wherein said housings are stackable.

4. An arrangement as in claim 2, wherein said housings are stackable.

5. An arrangement as in claim 1, wherein one of said modules forms a network interface.

6. An arrangement as in claim 5, wherein said network interface includes a multi-bus connector connected to each of said multi-bus connectors.

7. An arrangement as in claim 1, wherein each of said modules includes a plurality of resources, said modules sharing resources among one another.

8. An arrangement as in claim 5, wherein said network interface includes a base of a cordless handset.

9. An arrangement as in claim 1, wherein said housings each have a top and a bottom, and a notch at the bottom for furnishing air flow.

10. An arrangement as in claim 1, wherein the multi-bus connector in each of the said modules lies near a corresponding plane in each of said modules, said multi-bus connector of one of said modules connecting to the connector of another of said modules to form a bus.

11. An arrangement as in claim 1, wherein each of said modules includes a primary signal processing circuit separated from the primary signal processing circuit of other of said modules, said multi-bus connectors being engagable to form a bus, said circuits in each module being accessible by any of said circuits in the others of said modules.

12. An arrangement as in claim 1, further comprising a base unit, said modules having plug-in connectors at each of said housings, said base unit having a plurality of plug-in connectors, said base unit accepting the plug-in connectors of said modules, said plug-in connectors of said base unit being interconnected with each other.

13. An arrangement as in claim 1, wherein the operating structure of one of said modules includes a video processing section and the operating structure of another of said modules includes an audio processing section.

14. An arrangement as in claim 1, wherein the operating structure of one of said modules includes a video processing section and the operating structure of another of said modules includes an information processing section.

15. An arrangement as in claim 1, wherein the operating structure of one of said modules includes an audio processing section and the operating structure of another of said modules includes an audio processing section.

16. An arrangement as in claim 12, wherein said base unit forms a network interface module for connection to an external network.

17. An arrangement as in claim 15, wherein the operating structure of one of said modules includes a video processing section and the operating structure of another of said modules includes an audio processing section and the operating structure of another of said modules includes an information processing section.

* * * * *